United States Patent [19]

Nakanura et al.

[11] Patent Number: 4,938,160
[45] Date of Patent: Jul. 3, 1990

[54] SEWING MACHINE MOTOR CONTROL DEVICE

[75] Inventors: Takashi Nakanura; Akira Orii; Haruhiko Tanaka, all of Tokyo, Japan

[73] Assignee: Janome Sewing Machine Co. Ltd., Tokyo, Japan

[21] Appl. No.: 257,966

[22] Filed: Oct. 13, 1988

[30] Foreign Application Priority Data

Oct. 15, 1987 [JP] Japan .................................. 62-258379

[51] Int. Cl.⁵ ............................................ D05B 69/26
[52] U.S. Cl. .................................................. 112/275
[58] Field of Search .................... 112/275, 277, 67, 87, 112/220, 221; 318/567, 369, 269, 270

[56] References Cited

U.S. PATENT DOCUMENTS 4,732,099  3/1988  Neki et al. ............................ 112/275
4,791,344 12/1988  Yoshida et al. .................. 112/275 X Primary Examiner—Peter Nerbun
Attorney, Agent, or Firm—Michael J. Striker

[57] ABSTRACT

An electric motor of a sewing machine may be stopped naturally at an objective position by amending the amount of the motor's running errors as overrun or underrun with respect to the stop objective position without employing an especially forceful stopping circuit in spite of dispersions in a load inertia caused by mass-production of sewing machines or variances in loads during driving of the sewing machine.

2 Claims, 4 Drawing Sheets

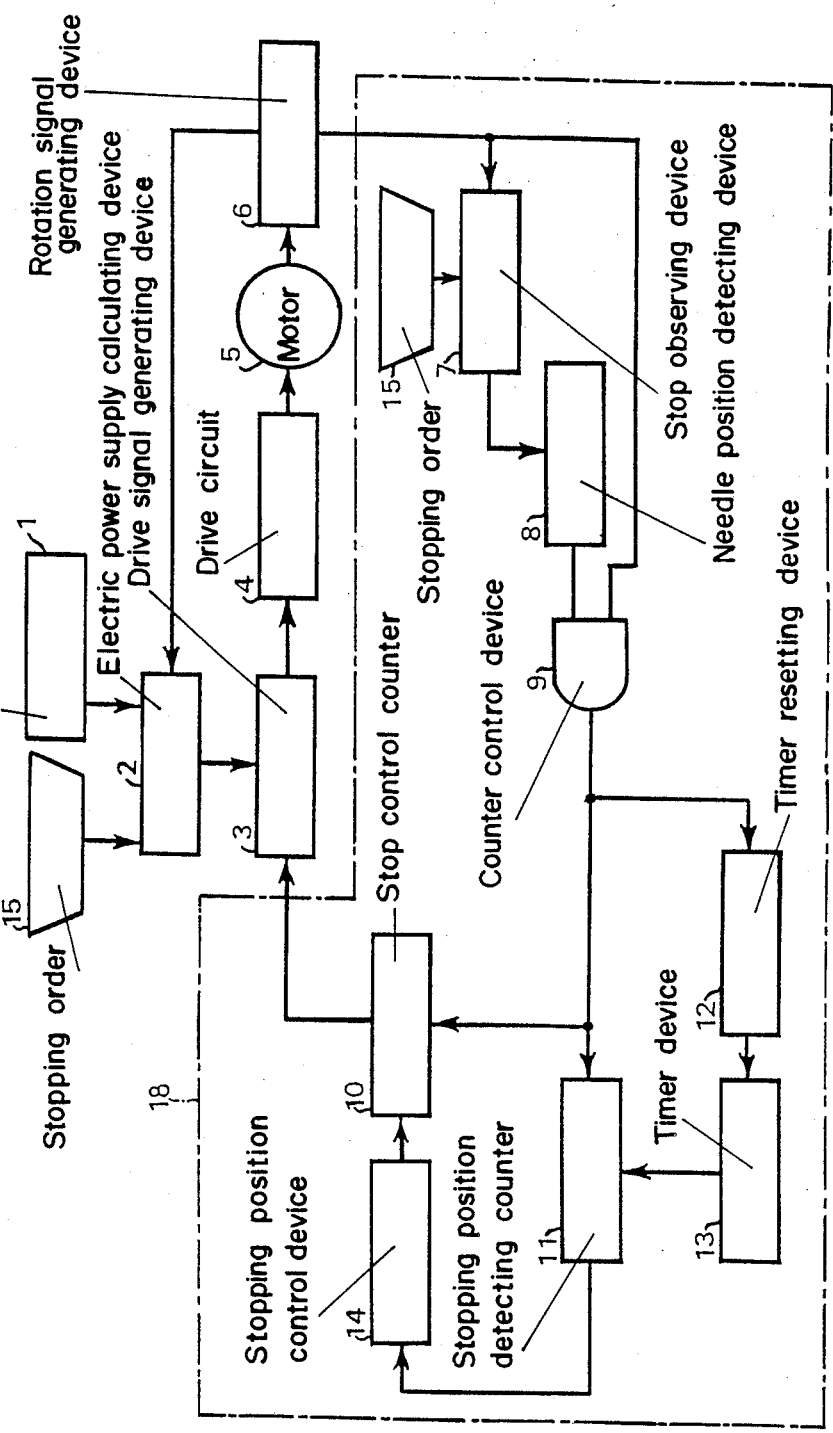
FIG_1

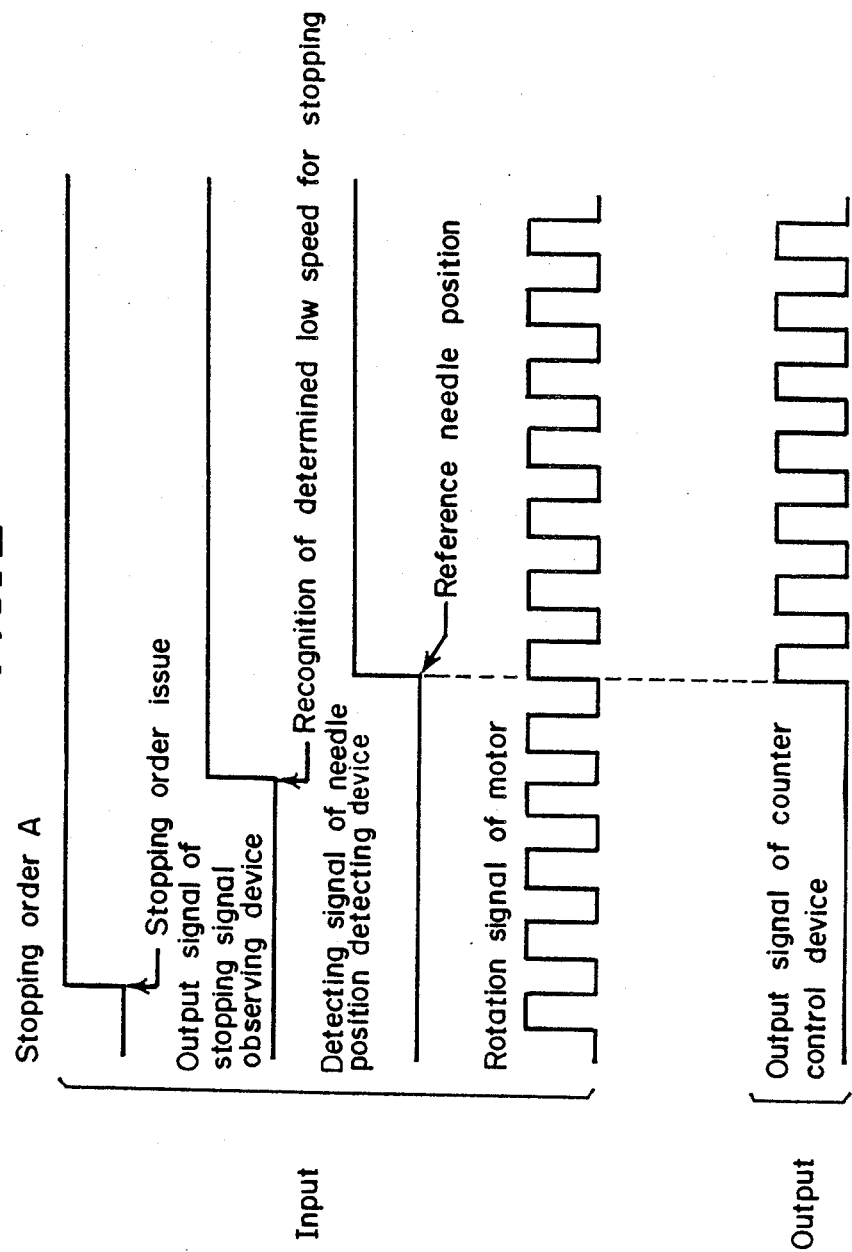

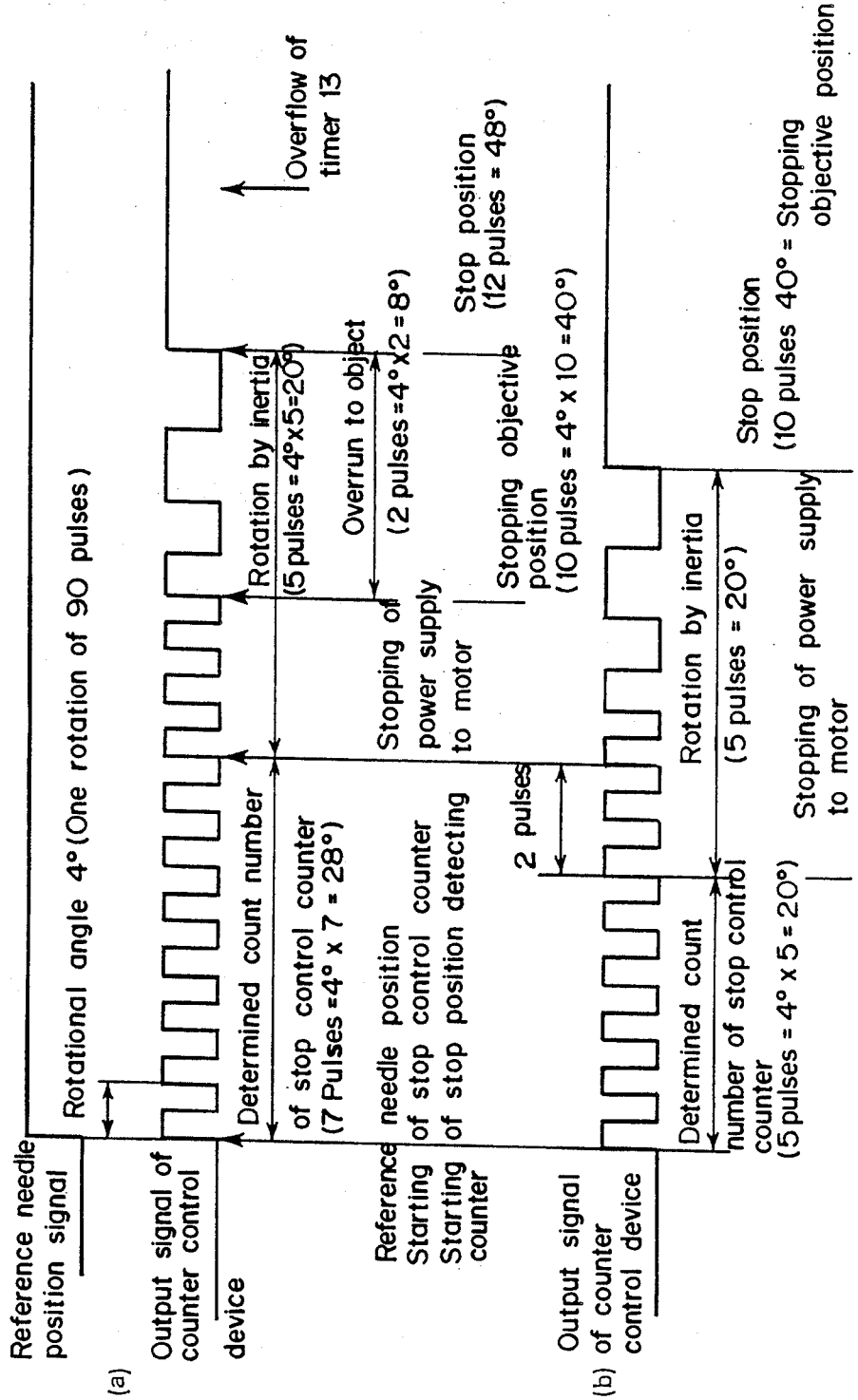
FIG_3

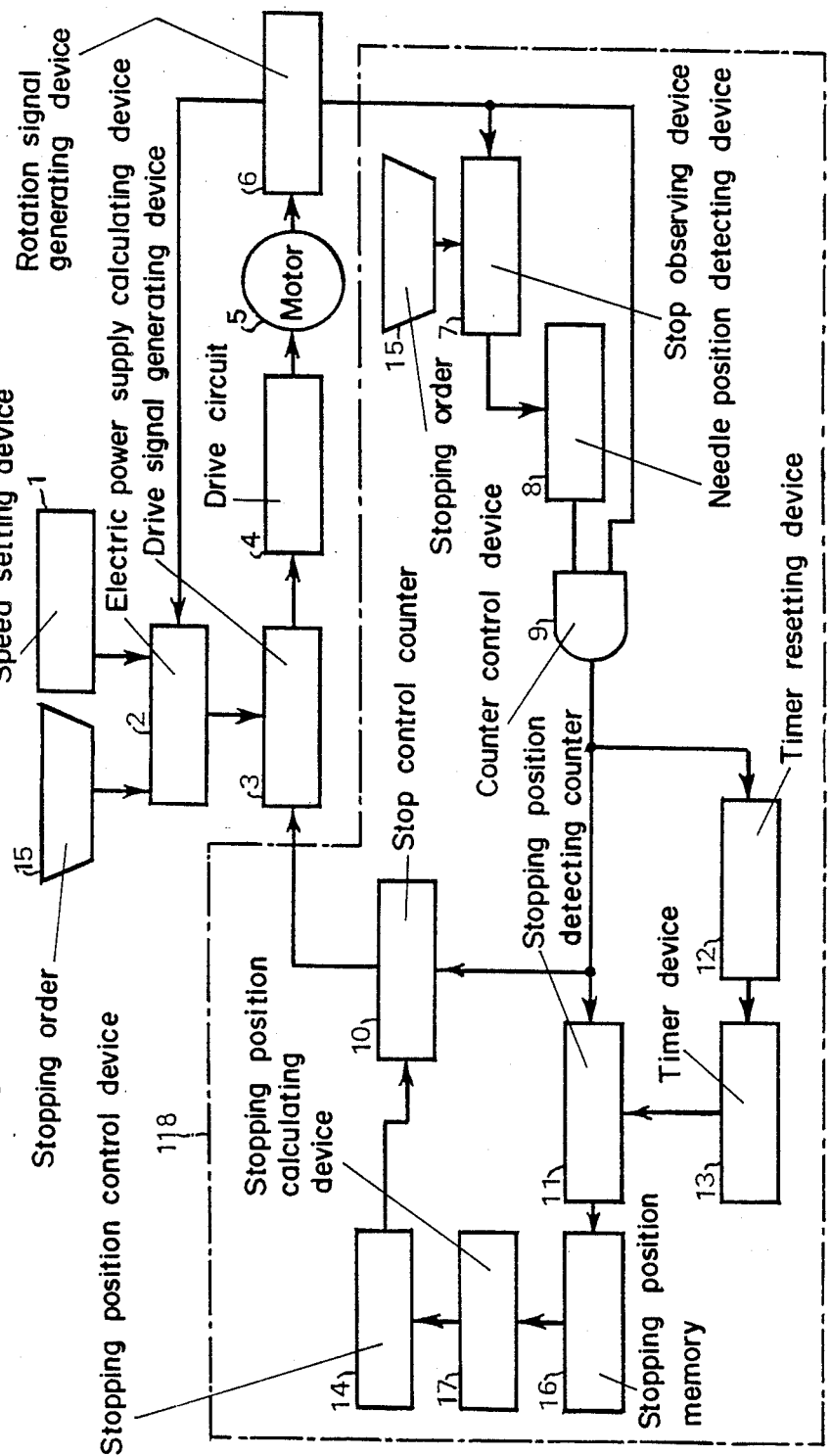
FIG_4

SEWING MACHINE MOTOR CONTROL DEVICE

FIELD OF THE INVENTION

This invention relates to a device for stopping a motor in a sewing machine, and more particularly to a stop control device for a motor which would precisely define stopping positions for the sewing machine. Dispersions at the stopping positions or non-uniformities of loads are caused because of mass-productions of sewing machines or changings in the loads during rotation of the sewing machine.

BACKGROUND OF THE INVENTION

The motor is stopped moderately at an objective position by controlling a speed down to a predetermined level, issuing a stop signal before the objective position, and stopping a power supply to the motor at issuance of the stop signal so as to stop the motor at the desired position by an inertia rotation under the load.

However, since the sewing machine arrives at the desired stop position as a result of the inertia rotation after having stopped the power supply, the stopping precision would be undesirable at the required position, if the load is varied during the rotation of the sewing machine due to dispersions or non-uniformities in the loads of the sewing machine, that is, dispersions in the amount of the inertia rotation of the motor and/or the sewing machine.

On the other hand, there has been proposed, in the sewing machine, a device where the motor is provided with a braking function for heightening the precision of stopping the needle at the desired position, for which a circuit to be used exclusively for the stopping is required, and a production cost is increased.

SUMMARY OF THE INVENTION

The present invention has been provided for solving the above mentioned problems.

It is an object of the invention to offer a stop control device of a relatively simple structure which can stop at the objective position, even though the amount of the inertia rotation is changed due to the inertia or friction in the machine structure and/or the motor.

For accomplishing the object, the invention proposes that, in a feedback speed control device of a sewing machine composed of a motor for driving adjustably a main shaft of the sewing machine, a device for determining the rotation speed of the motor, a device for issuing rotation signals as pulses of the motor, a power supply calculating device for comparing a rotation speed detected in accordance with the rotation signal output from the rotation signal issuing device with a speed determined by the speed determining device so as to calculate the power supply appropriately to be supplied to the motor, a device for issuing the drive signal to control the power supply in accordance with calculated results of the power supply calculating device, and a drive circuit for supplying the power to the motor by the drive signal;

a stop control device of a motor of a sewing machine proposed according to the present invention, comprises a device for issuing a stopping order signal to the motor;

a device for recognizing the motor running at a fixed low speed by the rotation signal of the motor when issuing the stopping order signal, and outputting a stopping speed signal ("stopping speed" here means such speed which results in stopping);

a needle position detecting device for detecting a rotation angle of the main shaft in response to a needle position when issuing an order of the stopping speed, and outputting a signal of the needle position which is a reference for control;

a counter control device for inputting the the needle position signal and the rotation signal and outputting a pulse signal in synchronism with the rotation signal when inputting the needle position signal;

a stop control counter for counting an output signal of the counter control device, and ordering the stop of outputting the drive signal the drive signal issuing device, when the counted output signal reaches a predetermined value;

a device for outputting a timer reset signal in synchronism with an output signal of the counter control device;

a timer device for outputting a timer overflow signal after time longer than a period of the rotation signal when a reset signal is reset by the timer reset signal, and the timer reset signal is not input;

a stopping position detecting counter device for counting an output signal of the counter control device until the timer overflow signal is output; and a stopping position control device for comparing a count value of the stopping position detecting counter device with a count value equivalent to a pre-set objective stopping position, and amending a set value of the stop control counter by the difference of the above count values.

BRIEF DESCRIPTION OF THE DRAWINGS

FIG. 1 is a block diagram for explaining a structure of a control device in a first embodiment of the invention;

FIG. 2 shows inputs and output of a counter control device;

FIG. 3 is a view for explaining stop controls; and

FIG. 4 is a block diagram for explaining a structure of a control device in a second embodiment of the invention.

DETAILED DESCRIPTION OF PREFERRED EMBODIMENTS OF THE INVENTION

The reference numeral 1 designates a speed setting device comprising a machine controller for an operator of the sewing machine to determine the machine speed. The numeral 2 shows an electric power supply calculating device which is connected to the speed setting device 1, and detects rotational speeds of a motor 5 in accordance with rotation signals issued from a rotation signal generator 6 of the motor 5, and compares the detected rotational speed with a speed set by the device 1 so as to calculate an appropriate electric power to be supplied to the motor 5.

A drive signal generating device 3 is connected to the power supply calculating device 2, and generates a drive signal for supplying a power equivalent to a calculated electric power to be supplied. A drive circuit 4 is connected to the drive signal generating device 3, and supplies the electric power to the motor 5.

The present invention, as said above, adds a stop control device 18 shown with one-dotted-line in FIG. 1 to the feedback control device.

When the machine operator changes the set speed of the speed setting device 1 for stopping the motor 5 or stops the motor as a pattern stitching is finished, a stop ordering signal is issued. When the stop ordering signal is issued, the electric power supply calculating device 2 calculates the power to be supplied so as to control the motor 5 at a determined low speed.

The reference numeral 7 shows a stopping speed observing device, and when the stop ordering signal is output, this device 7 observes the rotation speed of the motor 5 and recognizes that the motor 5 is controlled at the low speed toward stopping, and outputs to a needle position detecting device 8 a stopping speed signal denoting that the speed is stopped.

The needle position detecting device includes, for example, as disclosed in Japanese Patent Application Laid Open 10922/80, a part for detecting rotational angles of the main shaft of the sewing machine in response to the needle position, and, as a needle position is to be predetermined prior to the stopping position, i.e., a part for issuing a reference needle position signal which is to be a reference of controlling. When the stopping speed signal is output from the stopping speed observing device 7, the reference needle position signal is issued prior to the stop objective position.

The numeral 6 designates a rotational signal issuing device which detects the rotation of the motor 5, and issues 90 pulses per one rotation (360°) of the main shaft in synchronism with the rotation of the main shaft.

The numeral 9 is a counter control device which outputs pulse signals in synchronism with rotation signals of the motor 5, when the needle position signal is generated by the needle position detecting device 8.

The input and output signals of the counter control device 9 will be explained with reference to FIG. 2. A stop control counter 10 counts the pulse signal output from the counter control device 9, and orders to stop outputting of the drive signal output to the drive signal generating device 3 when the pulse signal reaches a predetermined count value by a stopping position control device 14. In other words, when the pulse signal reaches the predetermined rotational angle from the reference needle position the stopping control counter 10 stops the supply of the electric power to the motor 5. The counted value is cleared by the stopping order.

The output of the counter control device 9 is also an input to a stop position detecting counter 11 to count the pulse signal output from the counter control device 9 similarly to the stop control counter 10. The counting is continued until a timer overflow signal is output from a timer 13. The timer 13 notifies the stop position detecting counter 11 that the motor 5 is stopped. The overflowing time of the timer is equal to a period of the pulse signal output from the counter control device 9. A timer value is reset by the timer reset device 12 in synchronism with the pulse signal. That is, the stopping position detecting counter 11 detects the stopping position of the motor 5 by counting the pulse signal output from the counter control device 9.

A stop position control device 14 compares a value of the stop position detecting counter 11 with a counter value corresponding to the predetermined objective stopping position, and resets the set count value of the stop control counter 10 such that the motor 5 stops at the desired position.

FIG. 3 shows actual examples with respect to amendments of the set values. FIG. 3 (a) shows a case that the supply of the electric power is stopped to the motor 5 when the count value of the stop control counter 10 becomes 7. After stopping the supply of the electric power, the rotation is continued due to the inertia of the sewing machine. When the motor 5 is completely stopped naturally, the count value of the stop position detecting counter 11 designates 12, and this is an overrun by 2 counts (8°) with respect to the count value 10 of the stop objective position. This value is amended and reset by the stop position control device 14 such that a count value predetermined in the stop control counter 10 is rendered to be 5 counts which is less 2 counts. When the count value of the stop control counter 10 designates 5, it is possible thereby to stop the motor 5 naturally at the objective position by stopping the supply of the power to the motor.

A second embodiment of the invention will be explained, referring to FIG. 4. This embodiment is different from the first one in handling data of a stop position control device 118, and is the same with respect to other features. So, only the different parts will be discussed.

The stop position detecting counter 11 is connected to the counter control device 9, and when the timer 13 overflows, the count value of the stop position detecting counter 11 is stored in a stop position memory 16. This device 16 is a random access memory (RAM) which may store a plurality of count values as data. The data are renewed with a ring counter each time of stopping.

A stop position calculating device 17 calculates average values in the past of the stop position detecting counter 11 from the data values stored in a stop position memory 16 and number of the data.

The stop position control device 14 compares calculated results with counter values corresponding to the predetermined objective stop position, and calcualtes distances and directions with respect to the desired stop position, and resets the determined count value of the stop control counter 10 such that the motor 5 stops at the stop position. In the present embodiment, experimentally obtained and optional values are used as the set count value of the stop control counter 10 just after supplying the electric power, but the past data may be used so that the contents of the stop position memory serves as a backup source.

What is claimed is:

1. A stop control system for a sewing machine including a main shaft, a drive motor for rotating the main shaft, a drive motor feedback speed control drive, and drive signal generating means for controlling power to be supplied to the drive motor in accordance with difference between a set rotational speed of the drive motor and an actual speed of the drive motor, to effect operation of the drive motor at the set rotational speed, said stop control system comprising:

sensor means for sensing an actual rotational speed of the drive motor and for generating a pulse signal in response thereto;

means for generating a stopping signal for reducing the actual rotational speed of the drive motor to a stopping speed of the drive motor;

means for sensing a reduced rotational speed in response to the stopping signal and for generating a stopping speed signal;

rotational angle detecting means for detecting an angular position of the main shaft at which a needle of the sewing machine is to be stopped, in response to the stopping speed signal and for generating a main shaft angular position signal;

counter control means for generating, in response to the angular position signal, a plurality of pulse signals in synchronism with pulse signals generated by said sensor means until the pulse signals from said sensor means disappear;

stop control counter means for counting the pulse signals from said counter control means and for communicating a motor stopping signal to the drive signal generating means upon said plurality of pulse signals generated by said counter control means reaching a predetermined magnitude;

main shaft position detecting counter means operable in synchronism with said counter control means for counting the pulse signals from said counter control means; and stop position control means for comparing a pulse count-up value of said main shaft position detecting counter means with a predetermined set count value stored in said stop position control means and corresponding to a predetermined angular stop position of the main shaft, for communicating a differential signal to said stop control counter means in response to the pulse count-up value deviating from the predetermined set count value for adjusting a count-up value of said stop control counter means.

2. A stop control system as set forth in claim 1, further comprising memory means for storing the pulse count-up value of said main shaft position detecting counter means in response to each actuation of said stopping signal generating means; a counter for counting the pulse count-up value of said main shaft position detecting means in response to each actuation of said stopping signal generating means to renew a pulse count-up value stored in said memory means; and means for calculating an average value of pulse count-up values stored in said memory means, said stop position control means comparing the average value with the predetermined set count value stored therein for generating a differential signal for adjusting the count-up value of said stop control counter means in response to the average value deviating from the predetermined set count value.

* * * * *